United States Patent
Mitchell et al.

(10) Patent No.: US 10,101,878 B2
(45) Date of Patent: Oct. 16, 2018

(54) SHARING MAP CONTEXT INCLUDING RESULT CARDS

(71) Applicant: Microsoft Technology Licensing, LLC, Redmond, WA (US)

(72) Inventors: Chelsea Nicole Mitchell, Seattle, WA (US); Srinivas Kanakapally, Bothell, WA (US); Viktor Halitsyn, Bellevue, WA (US); Ryan Honig, Seattle, WA (US); Yekaterina Grabar, Bellevue, WA (US); Romualdo Impas, Seattle, WA (US); Dvir Horovitz, Redmond, WA (US); Karl Eberhard Tolgu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 379 days.

(21) Appl. No.: 14/809,254

(22) Filed: Jul. 26, 2015

(65) Prior Publication Data
US 2017/0010763 A1    Jan. 12, 2017

Related U.S. Application Data

(60) Provisional application No. 62/189,119, filed on Jul. 6, 2015.

(51) Int. Cl.
*G06F 3/0482* (2013.01)
*G01C 21/36* (2006.01)
(Continued)

(52) U.S. Cl.
CPC ....... *G06F 3/0482* (2013.01); *G01C 21/3682* (2013.01); *G06F 3/04842* (2013.01);
(Continued)

(58) Field of Classification Search
CPC ......... G06F 17/30876; G06F 17/30861; G06F 17/30882; G06F 17/30887; G06F 3/0482;
(Continued)

(56) References Cited

U.S. PATENT DOCUMENTS 7,439,969 B2    10/2008    Chithambaram et al.
8,145,416 B2     3/2012    Wailes et al.
(Continued)

OTHER PUBLICATIONS

"Share the Map", Published on: Sep. 23, 2014, Available at: https://support.google.com/maps/answer/144361?hl=en.
(Continued)

*Primary Examiner* — Nicholas Ulrich
(74) *Attorney, Agent, or Firm* — International IP Law Group, P.L.L.C.

(57) ABSTRACT

Systems and methods for sharing a map context of an originating computer user with a plurality of other users is presented. An originating user identifies at least some of a plurality of result cards displayed in conjunction with a map displayed in a browser view with one or more other users. A shared URL is generated according to the map context comprising at least the selected result cards. The shared URL is configured such that navigation by another browser on another computing device according to the shared URL displays the map context in a browser view of the another browser and the selected result cards in conjunction with the map in the browser view.

15 Claims, 11 Drawing Sheets

(51) Int. Cl.
*G09B 29/00* (2006.01)
*H04L 12/58* (2006.01)
*G06F 17/30* (2006.01)
*G06F 3/0484* (2013.01)

(52) U.S. Cl.
CPC .. *G06F 17/30864* (2013.01); *G06F 17/30887* (2013.01); *G09B 29/003* (2013.01); *H04L 51/08* (2013.01); *H04L 51/20* (2013.01)

(58) Field of Classification Search
CPC ..... G06F 2203/04806; G06F 17/30241; G06F 17/30061; G06F 17/30395; G06F 17/30554; G06F 17/3087; G06F 17/30991; G06F 17/30864; G06F 3/04842; G09B 29/003; G01C 21/3682; G01C 21/3667; Y10S 707/919; H04L 51/32; H04L 67/02; H04L 51/20; H04L 61/609; H04L 51/08; H04W 4/008
See application file for complete search history.

(56) References Cited

U.S. PATENT DOCUMENTS

| | | |
|---|---|---|
| 8,489,641 B1 | 7/2013 | Seefeld et al. |
| 8,775,962 B2 | 7/2014 | Boykin et al. |
| 2007/0233695 A1* | 10/2007 | Boudreau ............. G01C 21/20 |
| 2007/0288164 A1 | 12/2007 | Gordon et al. |
| 2008/0238941 A1* | 10/2008 | Kinnan ................ G09B 29/007 |
| | | 345/630 |
| 2009/0325603 A1 | 12/2009 | Van Os et al. |
| 2011/0055244 A1 | 3/2011 | Donelli |
| 2013/0044137 A1 | 2/2013 | Forsblom et al. |
| 2013/0297591 A1* | 11/2013 | Seefeld ............ G06F 17/30241 |
| | | 707/722 |
| 2014/0038573 A1 | 2/2014 | Ngo et al. |
| 2014/0047354 A1 | 2/2014 | Karamchedu |
| 2014/0195525 A1 | 7/2014 | English et al. |
| 2014/0244786 A1* | 8/2014 | Shapira .................. H04L 67/10 |
| | | 709/217 |
| 2014/0359510 A1 | 12/2014 | Graf et al. |
| 2014/0365901 A1* | 12/2014 | Moha ................... G01C 21/367 |
| | | 715/738 |

OTHER PUBLICATIONS

"Appending Checkbox Selections to Url Through Form", Retrieved on: Mar. 26, 2015, Available at: http://www.abestweb.com/forums/showthread.php?86575-Appending-checkbox-selections-to-URL-through-form.

"Send and Share Your Maps and Directions", Retrieved on: Mar. 26, 2015, Available at: https://support.mapquest.com/hc/en-us/articles/202630144-Send-and-Share-Your-Maps-and-Directions.

* cited by examiner

SHARING MAP CONTEXT INCLUDING RESULT CARDS

CROSS-REFERENCE TO RELATED MATTER

This application is related to and claims priority to U.S. provisional patent application No. 62/189,119, filed Jul. 6, 2015, entitled "Sharing Map Context Including Result Cards," the subject matter of which is incorporated herein by reference.

BACKGROUND

Quite often, a person will wish to make plans for multiple people. For example, a person may wish to make plans to go to a ballgame, visit a restaurant, attend a concert, and the like. Typically, the plans will involve more than simply "meeting at the game." Indeed, quite often there will be many other stops or activities in addition to a main event.

Online mapping has improved to where a person may aggregate a variety of activities and locations such that the various activities, the various locations, driving directions, and the like are all layered together on a displayable map. However, once that person determines a general plan, or has suggestions as to what might occur, he/she then must relate that information to the others that are generally to be included in regard to the plans. In others words, after determining locations, events, directions, and the like, he/she must again enter the information such that it can be sent or related to the others. This often leads to a loss of fidelity, in addition to poor efficiency, when relating the information to others.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, systems and methods for sharing a map context of an originating computer user with a plurality of other users is presented. An originating user identifies at some of a plurality of result cards displayed in conjunction with a map displayed in a browser view with one or more other users. A shared URL is generated according to the map context comprising at least the selected result cards. The shared URL is configured such that navigation by another browser on another computing device according to the shared URL displays the map context in a browser view of the another browser and the selected result cards in conjunction with the map in the browser view.

According to additional aspects of the disclosed subject matter, a computer-implemented method for sharing a map context with one or more other computer users is presented. According to the method, a plurality of result cards are displayed in conjunction with the display of a map view by a browser application. An indication to share the current map context displayed in the browser view with one or more other computer users is received. A selection of result cards of the plurality of result cards displayed in conjunction with the map is received. The selected result cards are to be included in the map context be shared with the one or more other computer users. A shared URL is generated. The shared URL is generated according to the map context identified by the computer user, where the shared URL comprises information corresponding to the selection of result cards included in the map context. A communication is generated for distribution to one or more other computer users, the communication including the shared URL. Thereafter, the communication is distributed to the one or more other computer users.

According to further aspects of the disclosed subject matter, a method for presenting a map context of another computer user is presented. The method comprises receiving a shared URL from the other computer user, where the shared URL references the map context of the other computer user. The user causes a browser on the computing device to navigate to the location determined according to the shred URL and, in response, the browser displays a map in a browser view, further display a plurality of result cards in conjunction with the map. Data regarding at least one of the plurality of result cards is obtained and the data is displayed in conjunction with the display of the map in the browser view.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposes of clarity and definition, the term "exemplary," as used in this document, should be interpreted as serving as an illustration or example of something, and it should not be interpreted as an ideal or a leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, with regard to a record that may list one or more web sites, the term "result(s)" should be interpreted in the context of an inbox: that there may be a result in response to a request or that there may be plural results to the request.

The term "result card" corresponds to a collection of information and typically includes a visual represented for display in a browser view. The collection of information may comprise a variety of items including, by way of illustration and not limitation, any one or combination of: a set of universal resource locators (URLs), a set of geographic locations, descriptive information regarding an entity, directions from one location to another, search results (which may or may not have information that may be plotted on a map), private user collections (such as favorites), and the like. The term "map context" comprises to a collection of one or more result cards, and a geographic center point and zoom level with regard to the displayed map. As will be discussed below, a first person (also referred to as an originator) will create a map context including one or more result cards, selectively identify which result cards of the map context to share with other persons, and share the selected map context (based on the originator's selection of result cards) with other persons by way of a shared URL.

A shared URL is a hyperlink that is encoded with information regarding a shared map context. With regard to the shared URL, upon a person navigating a browser to the referenced location of the shared URL, the shared map context is presented to that person in the browser.

As suggested above, a person may often create a plan that involves multiple people (e.g., an outing among family or friends.) Quite frequently, the plans involve all parties meeting at a particular location at a particular time. Of course, the location of the various rendezvous points might not be well known to everyone such that directions, potential parking spaces, and potential additional activities should be mapped out. Typically, once a plan or itinerary is in place it is sent to the other parties that are involved. However, it is left to the other parties to identify their routes, travel times, alternative locations, etc. in order to participate. Considering that the organizer likely did all of the research, it is inefficient to have each other party to do the same thing—with the hope that each other party will get the same results. Aspects of the disclosed subject matter address this inefficiency by permitting a first person to share a shared URL with other parties such that, upon navigating to the shared URL, the other parties are presented with the same map context as was shared by the first person.

Figure 1A:
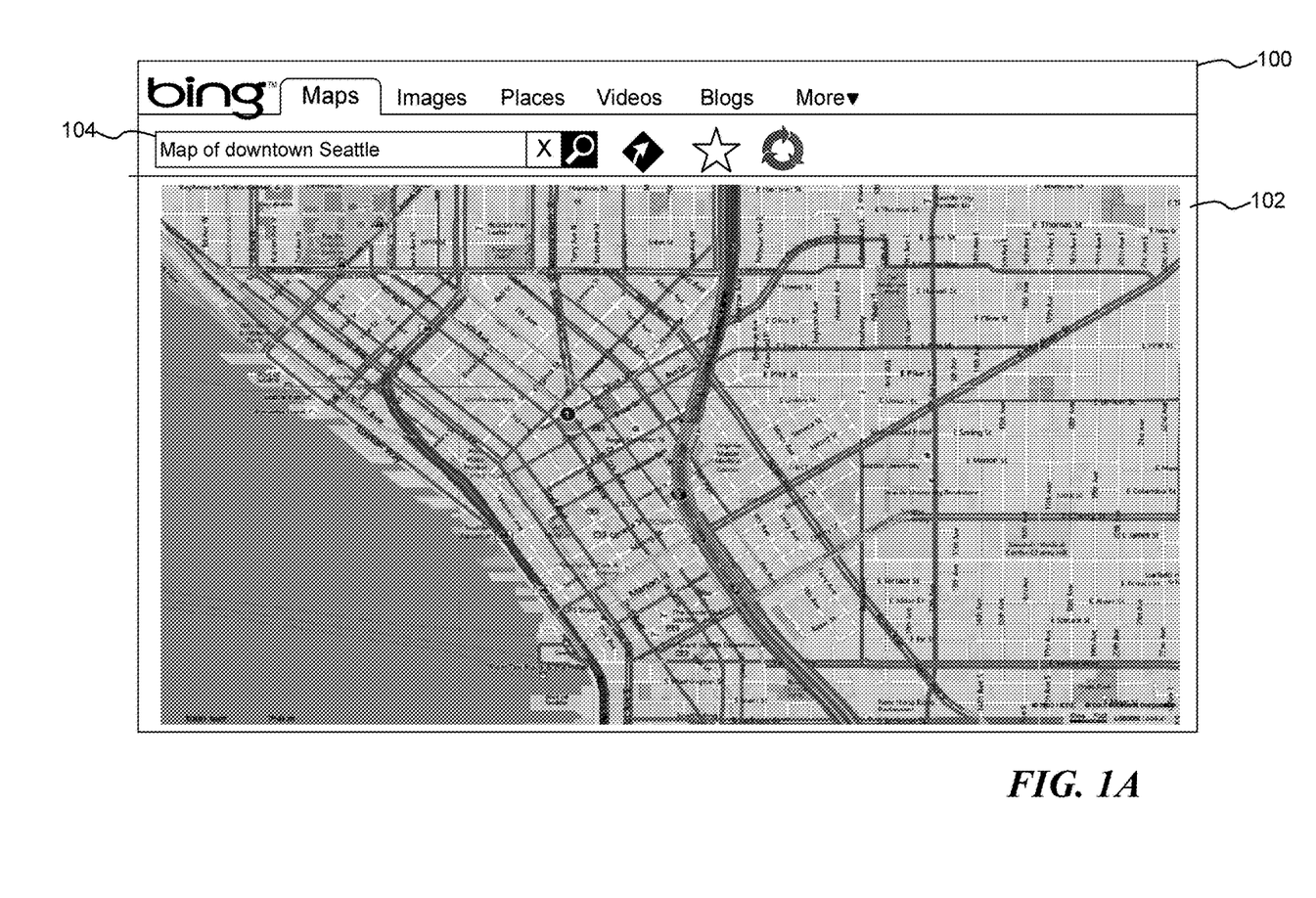
FIGS. 1A-1F are pictorial diagrams illustrating an exemplary browser view displayed on a computing device of a first user in conjunction with creating a map context for sharing with one or more other persons.

To better illustrate aspects of the disclosed subject matter, reference is made to the figures. Turning to FIGS. 1A-1F, these figures are pictorial diagrams illustrating an exemplary browser view 100 displayed on a computing device of a first user in conjunction with creating a map context for sharing with one or more other persons. With particular reference to FIG. 1A, for illustration purposes the browser view 100 includes a map view 102 displaying a map of downtown Seattle as a result of a user request (as indicated by request field 104). As can be seen, the map view 102 of FIG. 1A is free of layered results corresponding to results cards and illustrates the basis upon which a person/computer user may layer results to build a map context, all or some of which can be shared with others users according to aspects of the disclosed subject matter.

Figure 1B:
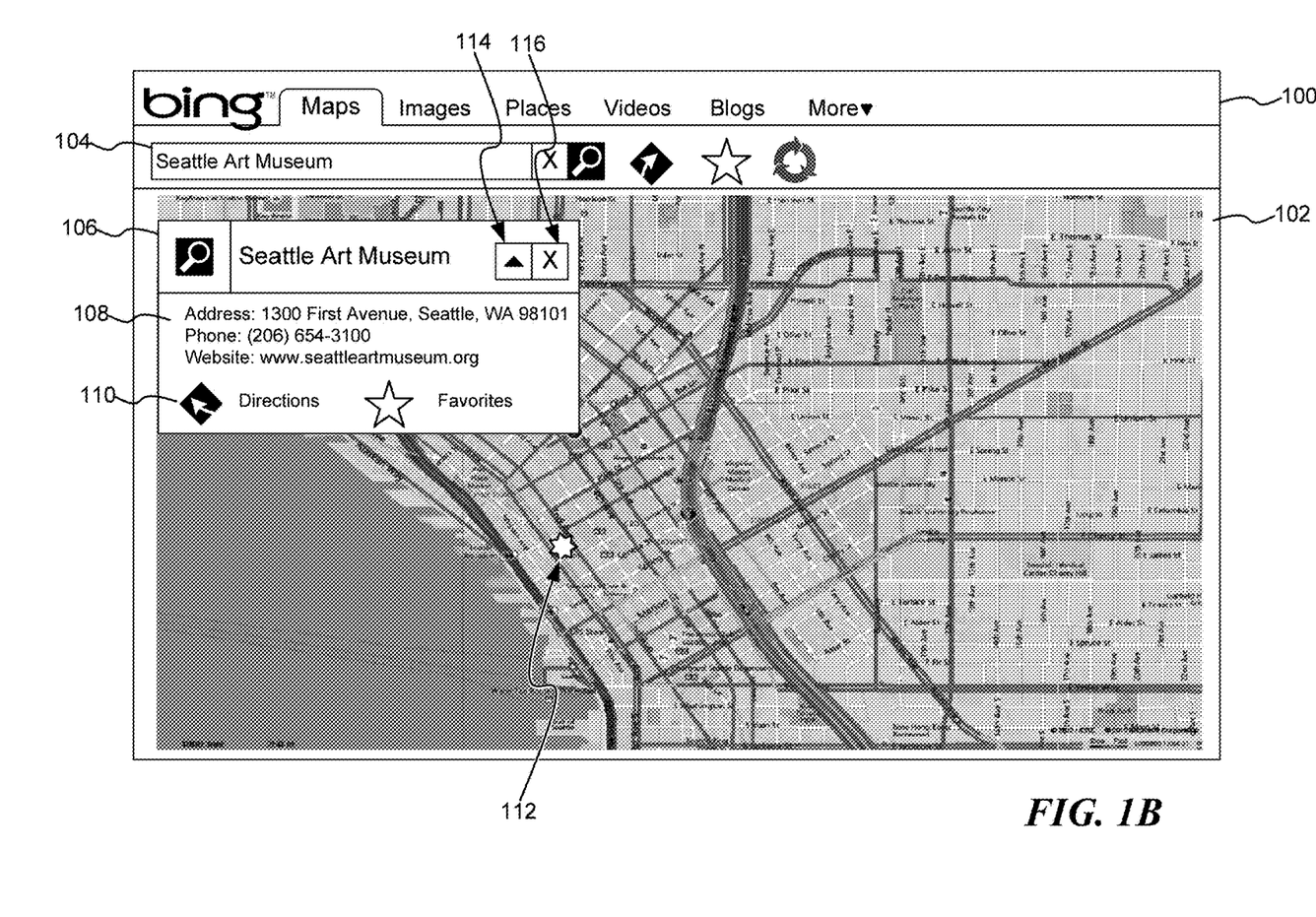

Turning to FIG. 1B, for illustration purposes FIG. 1B illustrates the map view 102 which now includes a result card 106 corresponding to the Seattle Art Museum. This result card 106 is in an expanded state such that additional information 108 regarding the topic of the result card (the Seattle Art Museum) is displayed. This result card 106 is presented on the map view 102 as a result of the person submitting a request regarding the Seattle Art Museum, as indicated by request field 104. In addition to the result card 106, a location marker 112 is now layered onto the map view 102 indicating the location of the Seattle Art Museum. The result card 106 also includes various controls for user convenience with regard to the topic/subject matter of the result card as well as management of the result card. For example, result card 106 includes an expand/minimize control 114 for expanding or minimizing the result card (i.e., causing the addition information 106 to displayed or not), a dismiss control 116 for dismissing the result card and corresponding information on the map view (i.e., the location marker 112) from the map view 102, and a direction control 110 for providing directions to the requested location (i.e., the Seattle Art Museum) on the map view.

Figure 1C:
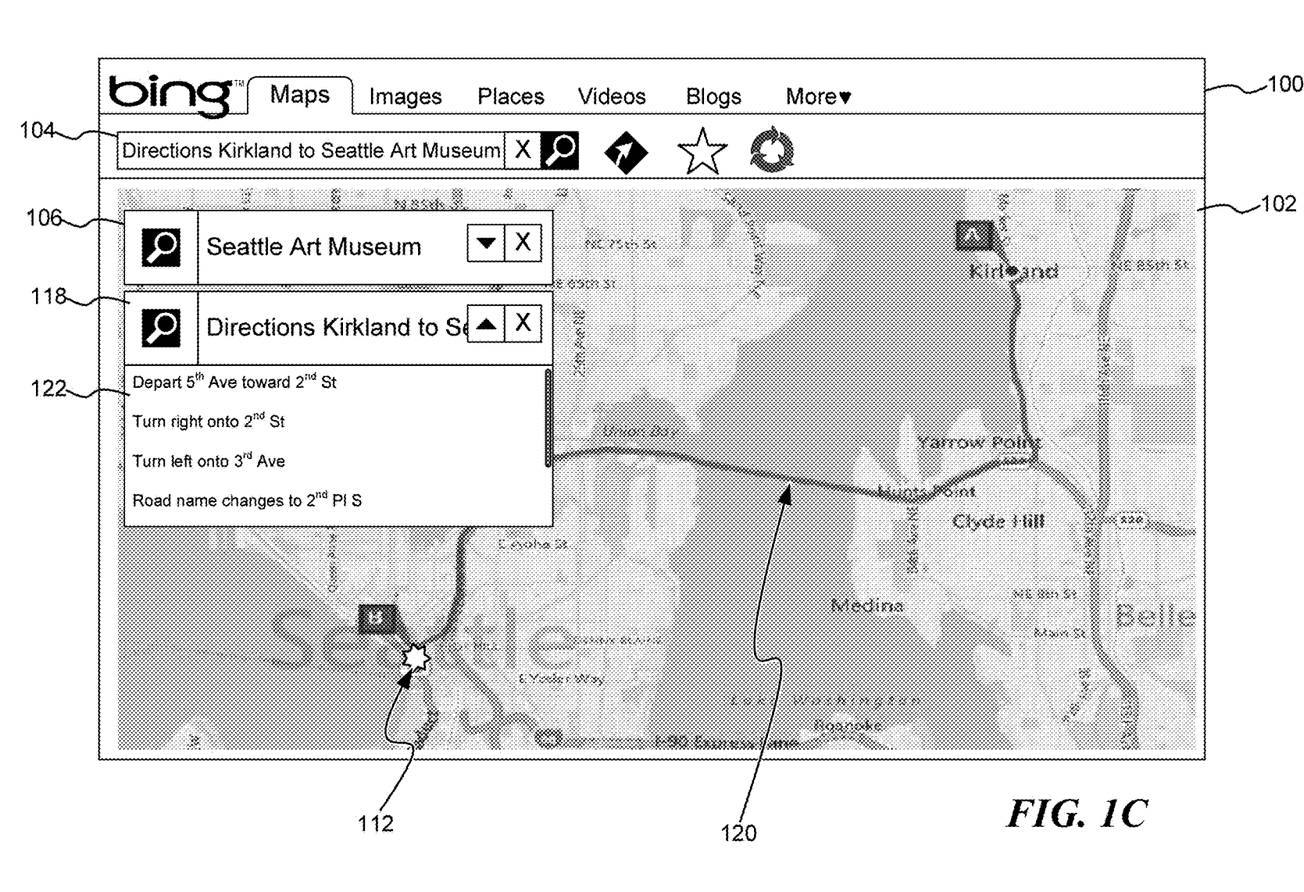

Assuming (for purposes of example and illustration) that the person selects the direction control 110, a new result card 118 is included within the map context of the map view 102, as shown in FIG. 1C. As can be seen, the results of obtaining directions to the intended location (Seattle Art Museum) has caused additional information to be layered or included in the map view 102, including the result card 118 with its additional information 122 describing directions from an origin (Kirkland) to the destination (Seattle Art Museum), as well as a graphic representation 120 of the route. Due to the directions, the zoom level of the map view 102 has been changed to fully include the graphic representation 120 of the route. While the zoom level of the map view 102 changed, other information that was already included in the map view is retained, such as result card 106 (in an unexpanded form) and location marker 112.

Figure 1D:
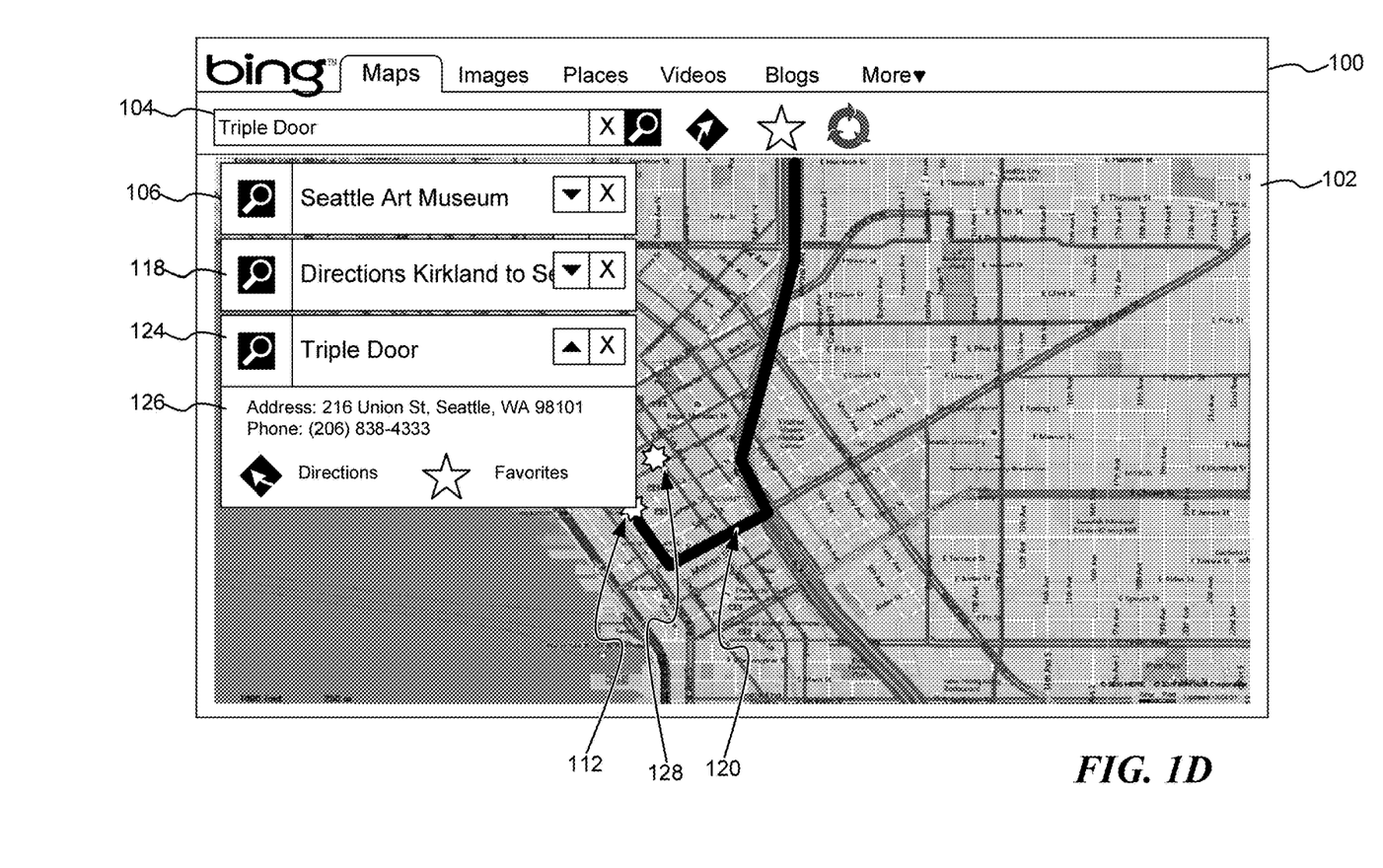
Figure 1E:
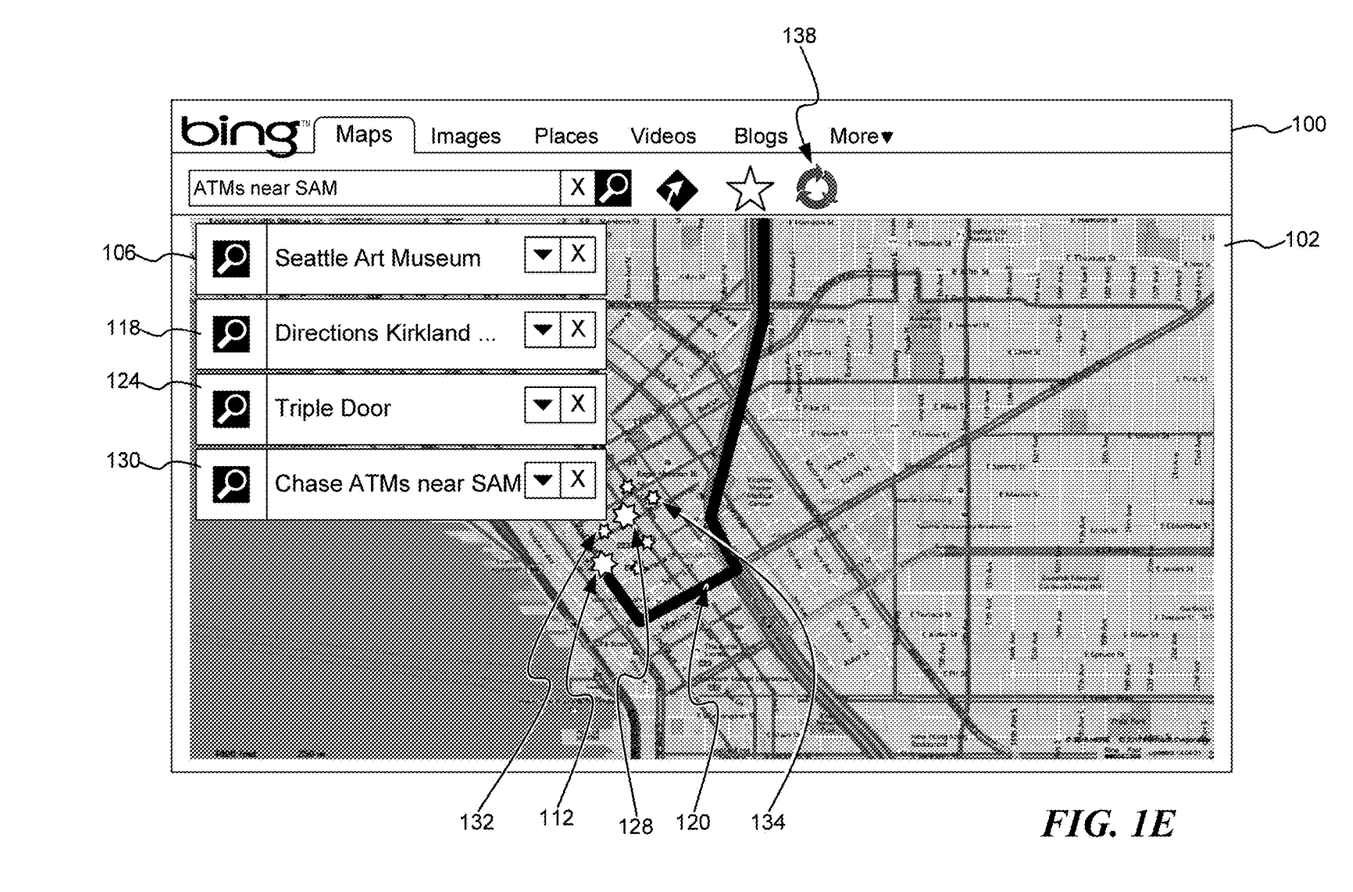

For purposes of illustration and example, assume that the organizer also wishes to plan an additional venue and enters the subject, the Triple Door, in the request field 104. Correspondingly, a new result card 124 is presented on the map view 102, in this case with additional information 126, as well as location marker 128 corresponding to the location of the additional venue. Also shown (by way of example) is that the person has rescaled the map view down to a location display of the area (downtown Seattle.) As can be seen, information corresponding to the various result cards (e.g., 106 and 118) remain in the map view 102. This information includes the graphic representation 120 of the requested route as well as the location marker 112 of the first venue (Seattle Art Museum).

For purposes of further illustration and example, assume now that the organizer also feels the need to locate an ATM (automated teller machine) to obtain some money for the evening's venues. By entering the request in the request field 104, a request card 130 and various locations of nearby ATMs are identified on the map view 102 of FIG. 1E, including ATM location markers 132 and 134.

Figure 1F:
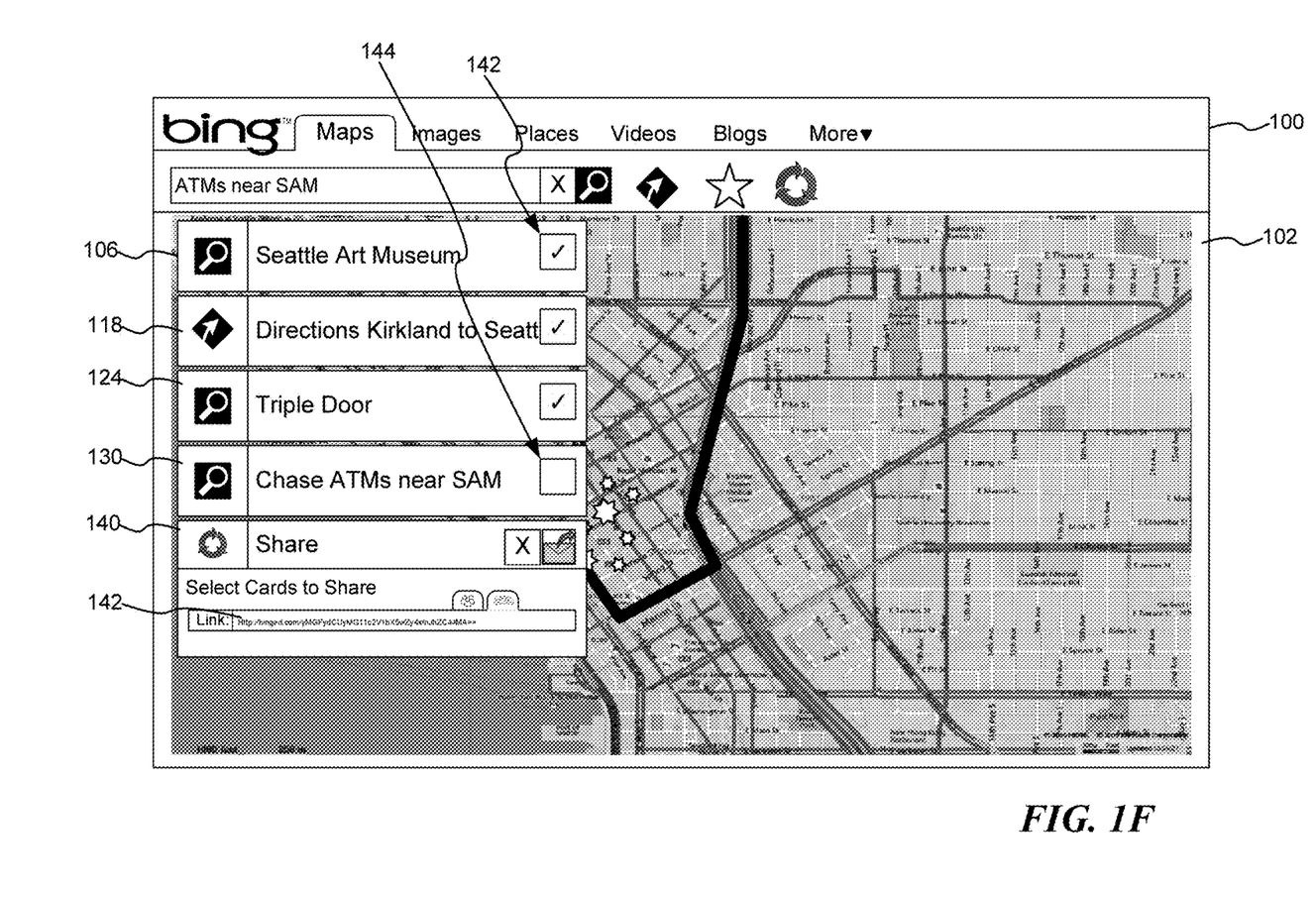

According to aspects of the disclosed subject matter, a person may layer various results (corresponding to result cards) on a map to create a map context and selectively share all or some of the results as a map context with other users. In the illustrated browser view 100, the organizer person may indicate an intent to share all or some of the results by activating a share control 138. FIG. 1F visually illustrates the results of activating the share control 138. As can be seen in FIG. 1F, in addition to the result cards 106 118 124 and 130, and the corresponding results in the map view 102, a share pane 140 is displayed. Through this share pane 140, the person can identify other persons (computer users) with which to share the map context, as well as which results, as identified by the result cards, to share with the other persons.

As shown in FIG. 1F, when the share pane 140 has been activated, each of the result cards, e.g., result cards 106, 118, 124 and 130, include a selection box (e.g., selection box 142 and 144) by which the person organizing the map context can selectively include or exclude result cards with the corresponding results. As shown in FIG. 1F, result card 106 is to be included in the map context distributed to other persons while result card 130 (corresponding to the ATMs near the various venues) is to be excluded from the map context. Also, the share pane 140 includes the ability to enter the names (or electronic addresses) of the various other persons to which the map context is to be sent, as well as a Share Link 146 to be sent to these other persons. According to aspects of the disclosed subject matter, the Share Link 146 comprises a hyperlink such that each recipient, upon activating the Share Link, will view the map context of the originating person. In the present, illustrated example, each identified person/recipient will receive a link that, upon navigation, causes the browser of that person to display a map view that contains result cards 106, 118 and 124, the results corresponding to the result cards, as well as the underlying map view 102 at the zoom level of the originating person and centered around the center-point presented to the originating person.

Figure 2:
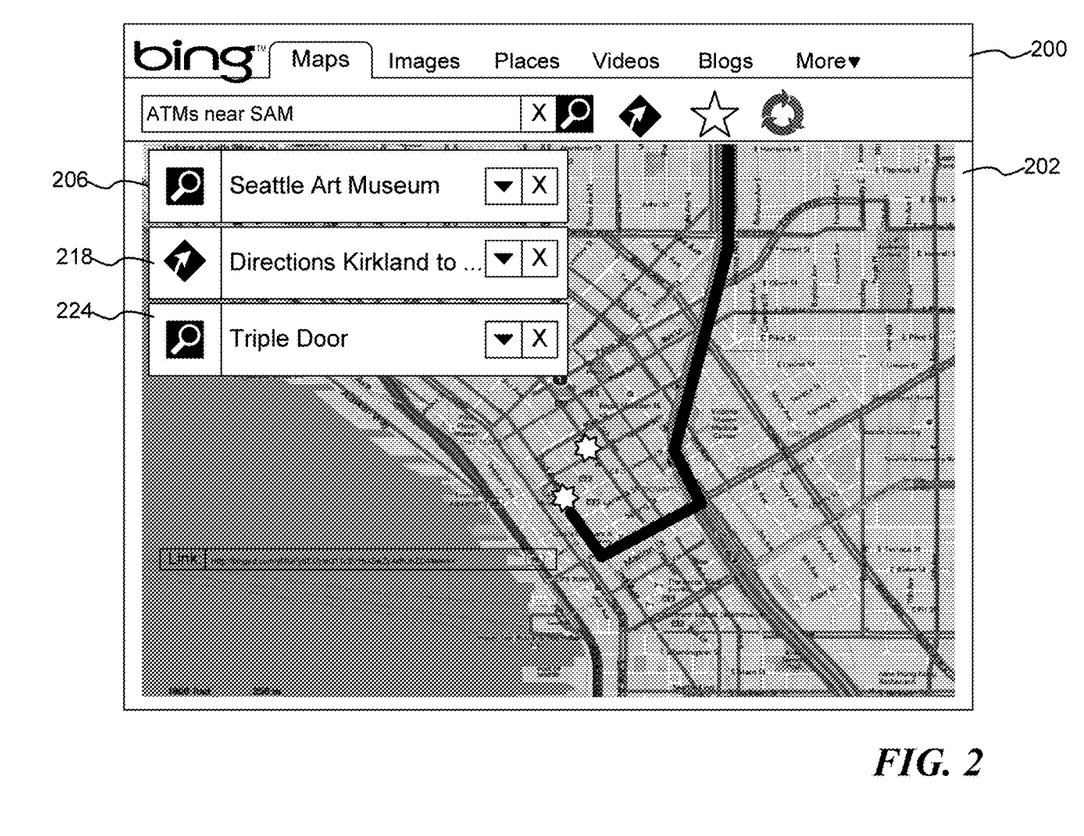
FIG. 2 is a pictorial diagram illustrating an exemplary browser view displayed on a computing device of a second user, illustrating the sharing the of the map context from the first user.

FIG. 2 is a pictorial diagram illustrating an exemplary browser view 200 displayed on a computing device of a second person and illustrating the shared map context from the first person (as organized in FIGS. 1A-1F.) As can be seen in FIG. 2, the map view 202 includes result cards 206, 218, and 224 (corresponding to result cards 106, 118 and 124 of FIG. 1F) as well as the corresponding results that were displayed in the map view 102. As indicated above, the map view 202 is displayed at the same resolution as map view 102 of FIG. 1F, and map view 202 is centered on the center point of map view 102.

As illustrated in FIG. 2, browser view 200 is smaller than browser view 100 of FIG. 1F. Even so, the shared map context, i.e., the shared result cards and correspond result information on the map, center point and zoom level, are all displayed in browser view 200. Of course, there may be circumstances that a particular display of a computing device may necessitate that zoom levels be modified, and/or that result cards become scrollable, and that some shared result information is not displayable. However, while the physical presentation of the information may be modified, the information, i.e., the map context, is the same among recipients as it was sent by the originator.

Figure 3:
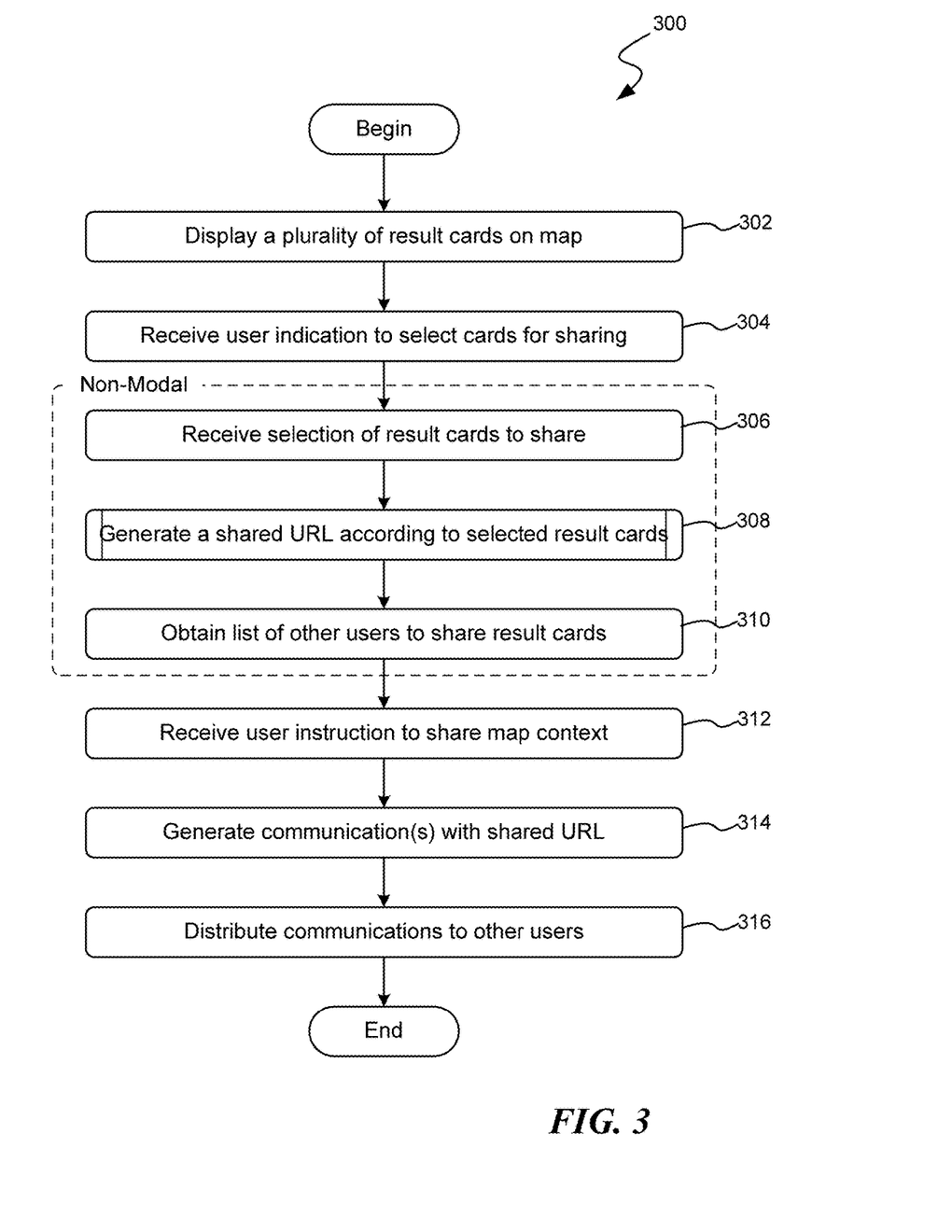
FIG. 3 is a flow diagram illustrating an exemplary routine for creating and sharing a map context with other users.

Turning now to FIG. 3, FIG. 3 is a flow diagram illustrating an exemplary routine 300 for creating and sharing a map context with other computer users. Beginning at block 302, a plurality of result cards are displayed on a map, such as shown in FIG. 1F. Of course, corresponding to the result cards may be result information that is displayed on the map, such as route information, locations or points of interest, and the like. At block 304, the routine 300 receives a user indication to select one or more result cards for sharing with other persons/computer users.

At block 306 and in response to receiving a user indication to share result cards with others, the exemplary routine receives a selection of result cards, of the plurality of result cards, to share with others. At block 308, a shared URL is generated according to the selected result cards. As indicated above, according to aspects of the disclosed subject matter, a shared URL is a hyperlink that is encoded with information regarding a shared map context. The shared map context is defined according to the selected result cards to be shared with others. Further, upon a person navigating a browser to the referenced location of the shared URL, the shared map context is presented to that person in the browser. Moreover, a browser, in displaying the shared map context, may be natively configured to extract the information (e.g., the selected result cards and corresponding information, the map center point, and zoom level) from the shared URL and display the information appropriately on a map, with zoom level and center point as display conditions permit. Alternatively, the functionality may be provided on a browser by way of a browser plug-in, which technology (browser plug-ins) is known in the art.

According to various aspects of the disclosed subject matter, the shared URL may be implemented in at least two methods. In a first embodiment, the shared URL may contain, of itself, all of the information of the map context (including result cards, zoom level, center point, and the like). To keep the shared URL to a minimal size, the map context/information may be encoded into the shared URL by way of a combination of compression techniques, tokenization of information, and the like. Alternatively, the entirety of the map context may be provided in a shared location, such as on a host service (e.g., a search engine or mapping service) and the particular shared location is referenced according to the encoded information in the shared URL. When a browser is directed to the shared URL in which the information is stored in a shared location, mechanisms such as browser redirection as well as the code (either native or via plug-in) is able to obtain the map context and display the information on a map according to the obtained map context.

In addition to generating the shared URL, at block 310 a list of other users is obtained, this list identifying those other computer users/persons who are to receive the map context via the shared URL. According to aspects of the disclosed subject matter, the persons generating the map context may individually identify the various users, identify groups of users, rely upon contact lists and address books, domain name services, and the like.

With regard to blocks 306, 308 and 310, as shown in FIG. 3 these are non-modal steps. According to aspects of the disclose subject matter, as these are non-modal steps they can be executed in various order and repeatedly executed. For example, the organizing person may identify one user, select a result card, identify other users, identify additional result cards, and the like. Further, the step of generating a shared URL may be conducted each time the shared map context (based on the selected result cards, the current zoom level and center point) is changed or just a single time when the organizing person provides an instruction to proceed with sharing.

At block 312, after the user has selected the result cards to be shared, as well as explicitly or implicitly determined the zoom level and center point, the routine 300 receives a user instruction to share the selected map context. At block 314, the routine causes a communication to be generated for each of the listed other users, where the communication for each the listed other users includes the shared URL. At block 316, the generated communications are distributed to each of the other user. The generated communications may be distributed to other users/persons via a variety of communication channels including, by way of illustration and not limitation, email messages, text messages (SMS or MMS), social networking posts, and the like. After distributing the communications, the routine 300 terminates.

Figure 4:
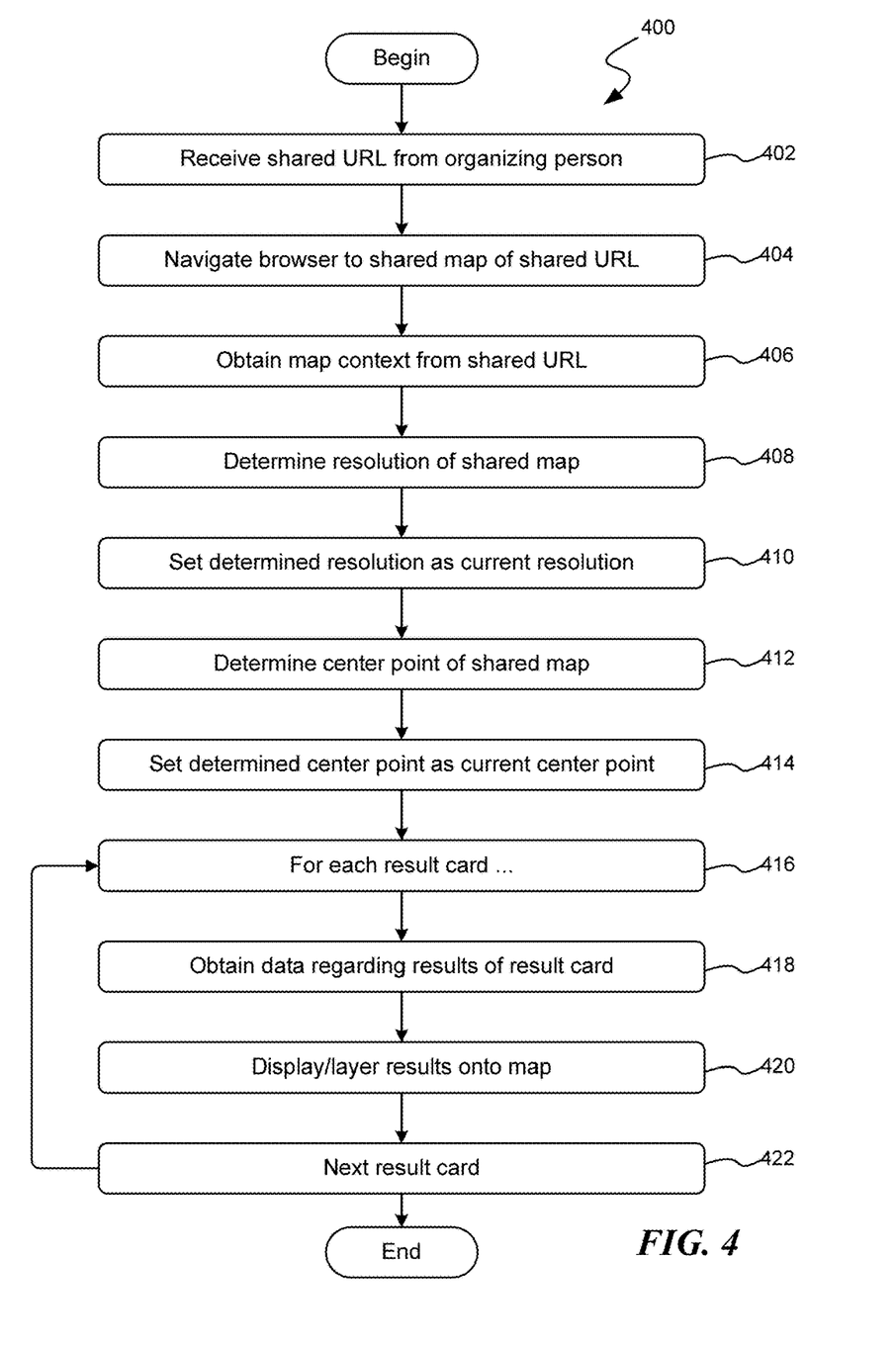
FIG. 4 is a flow diagram illustrating an exemplary routine for receiving and displaying the shared map context of the organizing user on a computing device.

In contrast to generating the shared map context and delivering the shared URL to other persons, FIG. 4 is a flow diagram illustrating an exemplary routine 400 for receiving and displaying the shared map context of the organizing user on a computing device. Beginning at block 402, the receiving person receives the shared URL from the organizing person. At block 404, the receiving person causes the person's browser to navigate to the shared map of the shared URL. In other words, the receiving person causes the browser to navigate to a destination according to the shared URL. Either by the native code of the browser or by the functionality provided by a plug-in module, at block 406 the map context of the shared URL is obtained. Obtaining the map context of the shared URL may comprise decoding the information from the shared URL. Alternatively, obtaining the map context of the shared URL may comprise retrieving the information from the shared location on the hosting service. In either event, at block 406 the map context is obtained.

At block 408, the resolution of the shared map for display in the browser is determined and at block 410 the display resolution of the browser is correspondingly set. At block 412, the center point of the shared map is determined form the shared map context and at block 414 the map is located at that center point.

At block 416, an iteration of the result cards of the map context is begun. Thus, for each card, at block 418 the data of the result card is obtained. At block 420, the information/results of the result card are displayed/layered on the displayed map. At block 422, a next result card is selected and the process returns to block 416 to continue the iteration. Alternatively, at block 422, if there are no more result cards to process from the shared map context, the routine 400 terminates after having presented the shared map context in the receiving person's browser.

Regarding routines 300 and 400 described above, as well as any other processes describe herein, while these routines/processes are expressed in regard to discrete steps, these steps should be viewed as being logical in nature and may or may not correspond to any actual and/or discrete steps of a particular implementation. Also, the order in which these steps are presented in the various routines and processes, unless otherwise indicated, should not be construed as the only order in which the steps may be carried out. In some instances, some of these steps, including those identified as being optional, may be omitted. Those skilled in the art will recognize that the logical presentation of steps of a routine or process is sufficiently instructive to carry out aspects of the claimed subject matter irrespective of any particular language in which the logical instructions/steps are embodied.

Of course, while these routines and processes include various novel features of the disclosed subject matter, other steps (not listed) may also be carried out in the execution of the subject matter set forth in these routines and processes. Those skilled in the art will appreciate that the logical steps of these routines/processes may be combined together or be comprised of multiple discrete steps. Steps of the above-described routines and processes may be carried out in parallel or in series. Often, but not exclusively, the functionality of the various routines and processes is embodied in software (e.g., applications, system services, libraries, executable modules, and the like) that is executed on one or more processors of computing devices, such as the computing device described below in regard FIG. 5. Additionally, in various embodiments all or some of the various routines may also be embodied in executable hardware modules including, but not limited to, system on chips, codecs, specially designed processors and or logic circuits, digital signal processors, and the like on a computer device or system.

As indicated, these routines/processes are typically embodied within executable code modules comprising routines, functions, looping structures, selectors such as if-then and if-then-else statements, assignments, arithmetic computations, and the like. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines and processes embodied within applications (also referred to as computer programs), apps (small, generally single or narrow purposed, applications), and/or methods, these aspects may also be embodied as computer-executable instructions stored by computer-readable media, also referred to as computer-readable storage media, which are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed, the execution thereof causes, configures and/or adapts the executing computing device (or devices) to carry out various steps, methods and/or functionality, including those steps, methods, routines and processes described above. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer-readable media may, in operation, deliver computer-executable instructions and/or data stored on the media to a computing device for execution via various transmission means and mediums, including transmission over carrier waves and/or propagated signals, for purposes of this disclosure computer readable media expressly excludes carrier waves and/or propagated signals.

Figure 5:
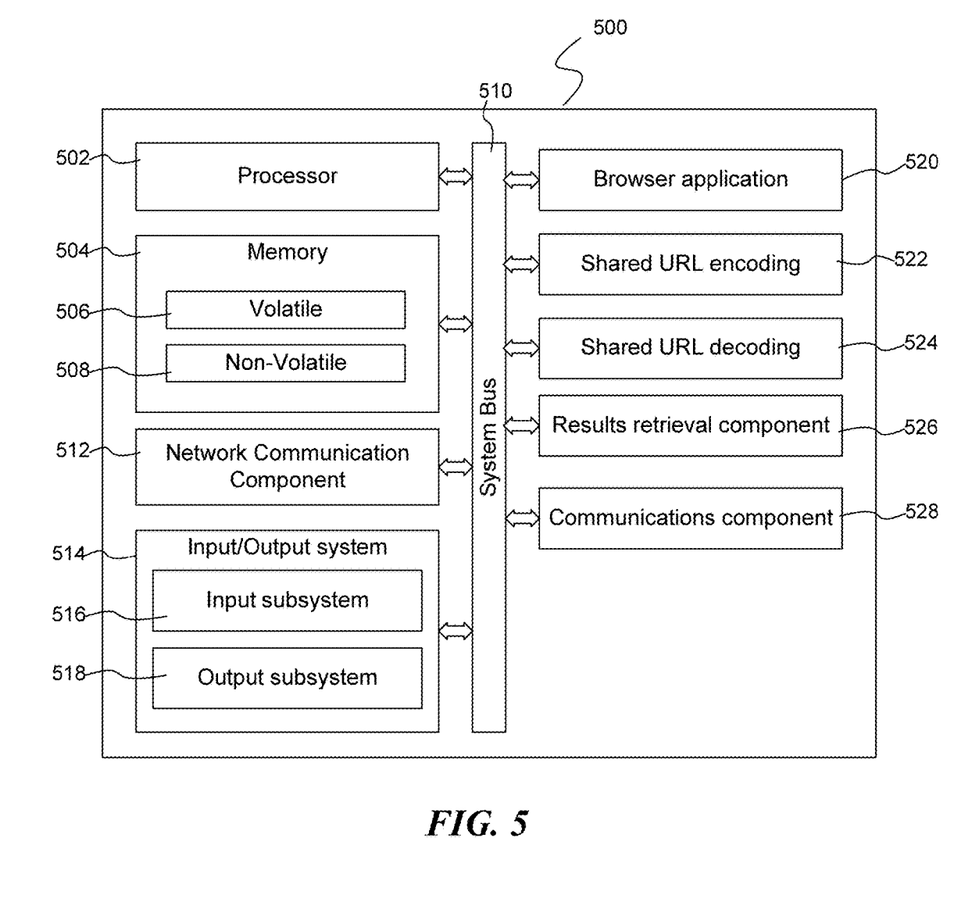
FIG. 5 is a block diagram illustrating an exemplary computing device for sharing a map context with others according to aspects of the disclosed subject matter.

Turning now to FIG. 5, FIG. 5 is a block diagram illustrating an exemplary computing device 500 for sharing a map context with others according to aspects of the disclosed subject matter. The exemplary computing device 500 includes one or more processors (or processing units), such as processor 502, and a memory 504. The processor 502 and memory 504, as well as other components, are interconnected by way of a system bus 510.

The memory 504 typically (but not always) comprises both volatile memory 506 and non-volatile memory 508. Volatile memory 506 retains or stores information so long as the memory is supplied with power. In contrast, non-volatile memory 508 is capable of storing (or persisting) information even when a power supply is not available. Generally speaking, RAM and CPU cache memory are examples of volatile memory 506 whereas ROM, solid-state memory devices, memory storage devices, and/or memory cards are examples of non-volatile memory 508.

The exemplary computing device 500 further includes a network communication component 512 for interconnecting this managed email service with other devices over a computer network, such as user computing devices 602, 604 and 606 communicating over network 608 as set forth in FIG. 9. The network communication component 512, which is sometimes referred to as a network interface card or NIC, communicates over a network using one or more communication protocols via a physical/tangible (e.g., wired, optical, etc.) connection, a wireless connection, or both. As will be readily appreciated by those skilled in the art, a network communication component, such as network communication component 512, is typically comprised of hardware and/or firmware components (and may also include or comprise executable software components) that transmit and receive digital and/or analog signals over a transmission medium (i.e., the network.)

As will be readily appreciated, the processor 502 executes instructions retrieved from the memory 504 (and/or from computer-readable media) in carrying out various functions, particularly in regard to responding to a single entity intent search query. The processor 502 may be comprised of any of a number of available processors such as single-processor, multi-processor, single-core units, and multi-core units.

The exemplary computing device 500 further includes an input/output (IO) system 514 by which a person can interact with the browser in defining a map context to share with others as well as display a shared map context to the person. IO systems 514 are well known in the art and typically include an input subsystem 516 that includes the hardware, devices, drivers by which the person using the computing device can interact with one or more components of the computing system, including applications such as a browser application 520. The output subsystem 518 includes the hardware, devices, drivers and modules by which information is presented to a person using the computing device 500, such as a display screen upon which the browser application 520 presents a map context.

The exemplary computing device 500 still further includes one or more application modules, including a browser application 520. As indicated above, the person interacts with the browser application to create a map context, identify others for share the map context, and cause the map context to be delivered as a shared URL to the identified others. Additionally, the exemplary computing device 500 includes a shared URL encoding component 522. According to one embodiment, the shared URL encoding component 522 encodes information of the identified result cards into an encoded shared URL 142. Alternatively, the shared URL encoding component 522 communicates with an external service, such as a mapping service 612, search engine 610, or online service (not shown) to provide an encoded shared URL for the map context to be shared with others. Correspondingly, the exemplary computing device 500 also includes a shared URL decoding component 524 to decode the encoded information (and/or retrieve the result cards information from a shared network service) and present the information on a map via the browser application 520.

Figure 6:
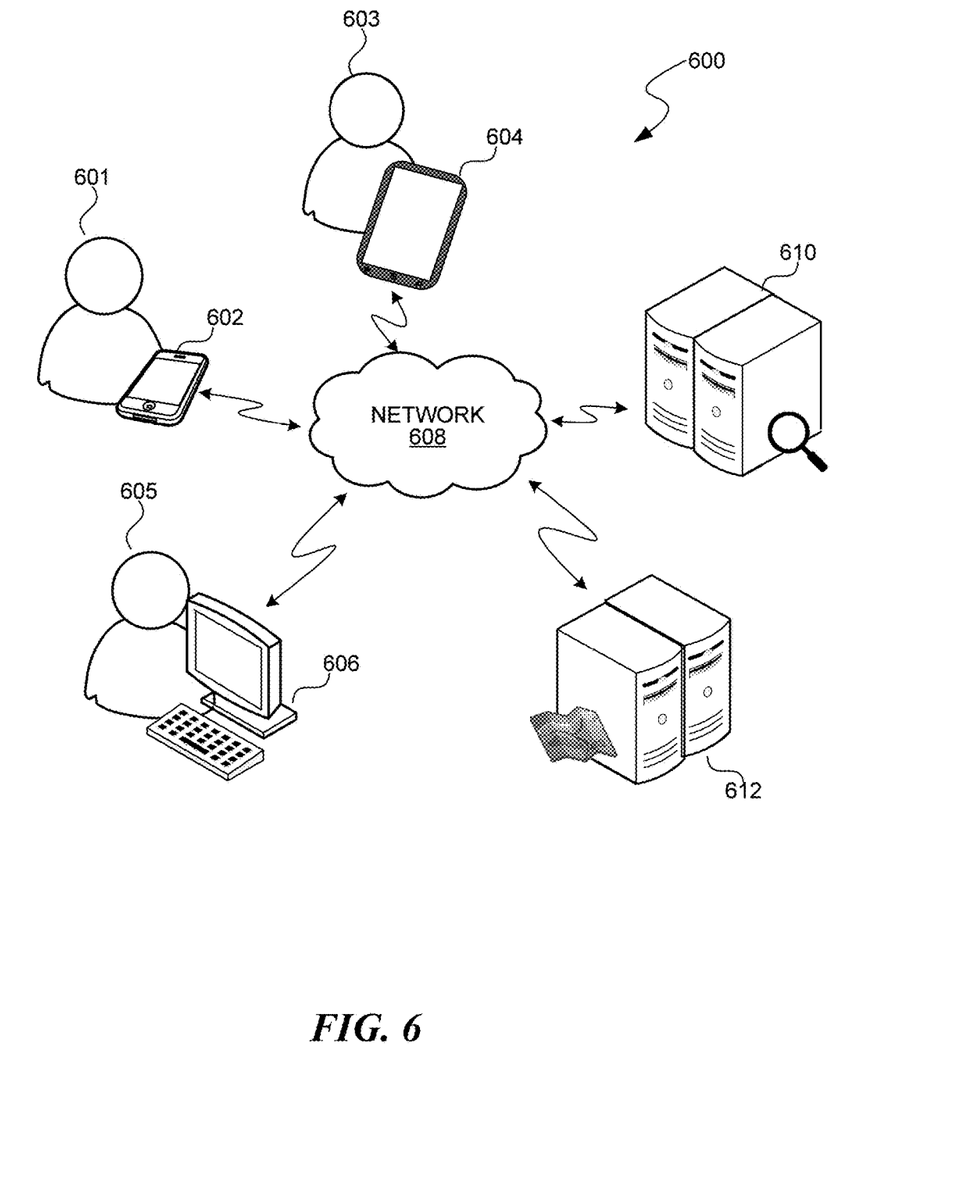
FIG. 6 is a block diagram illustrating an exemplary network environment suitable for implementing aspects of the disclosed subject matter.

Still further included in the exemplary computing device 500 is a results retrieval component 526 that obtains search results (represented as result cards on the map by the browser application 520) from a search engine 610 of FIG. 6. A communication component 528 is an application and/or service by which the organizing person can generate and transmit the shared URL to others via the network communication component 512.

Turning now to FIG. 6, FIG. 6 is a block diagram illustrating an exemplary network environment 600 suitable for implementing aspects of the disclosed subject matter including creating and sharing a map context by way of a shared URL. The exemplary network environment 600 includes user computing devices, such as user computing devices 602, 604 and 606, by which persons/computer users (e.g., users 601, 603, and 605) can inter-communicate over a computer network, such as network 608. The network 608 may include the Internet, a wide area network or WAN, a local area network or LAN, and the like. As will be appreciated, in addition to user computers, map information and result card information may be obtained from a variety of services and devices connected to the network 608 include, by way of illustration and not limitation, a search engine 610 and a mapping service 612. Other services and/or devices that are not shown may include, by way of illustration and not limitation, one or more communication services (such as an email service, a text messaging service, and social networking services, and the like), online storage service including services to host a shared map context as described above.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method for sharing a map context with one or more other computer users, the method comprising each of the following as executed on a computing device comprising at least a processor and memory:
   displaying a plurality of result cards in conjunction with the display of a map view by a browser application, wherein results of each of the plurality of result cards are layered on the map view;
   receiving an indication to share a map context with one or more other computer users; and
   in response to receiving the indication to share the map context with one or more other computer users:
      receiving a selection of result cards of the plurality of result cards, wherein the selected result cards are less than the plurality of result cards;
      generating a shared URL corresponding to the map context, wherein the shared URL comprises information corresponding to the selected result cards and excluding the result cards of the plurality of result cards that are not selected;
      generating a communication for distribution to the one or more other computer users, the communication including the shared URL; and
      distributing the communication to the one or more other computer users.

2. The method of claim 1, wherein the shared URL is configured such that navigation by a browser according to the shared URL displays the map context in the browser view, the map context including the selected result cards.

3. The method of claim 2, wherein the shared URL is encoded with information corresponding to the map context, including the result cards.

4. The method of claim 2, wherein the shared URL corresponds to map context information stored in a third party hosting service.

5. The method of claim 2, wherein the map context further includes a geographic center point of the map in the map view, and wherein the shared URL is configured such that navigation by a browser according to the shared URL displays the map context in the browser view, including displaying the map in the browser centered at the geographic center point.

6. The method of claim 5, wherein the map context further includes a zoom level corresponding to the map, and wherein the shared URL is configured such that navigation by a browser according to the shared URL displays the map context in the browser view, including displaying the map in the browser at the zoom level of the map context.

7. The method of claim 2, wherein a selected result card comprises result information corresponding to mapping information displayed on the map.

8. The method of claim 7, wherein the shared URL is configured such that navigation by a browser according to the shared URL displays the map context in the browser view including the result information corresponding to mapping information.

9. The method of claim 1, wherein distributing the communication to the one or more other computer users comprises distributing the communication to the to the one or more other computer users via any one or more of an email and an SMS message.

10. A computer system for sharing a map context displayed in a browser view on the computer system with one or more other computer users, the system comprising a processor and a memory, the additional components comprising:
   a browser application, the browser application configured to display a map in the browser view and further configured to display a plurality of result cards in conjunction with the map, wherein results of each of the plurality of result cards are layered on the map;
   a shared URL encoding component, the shared URL encoding component configured to encode a shared URL according to a map context comprising selected result cards of the plurality of result cards and excluding unselected result cards of the plurality of result cards; and
   a communication component, the communication component configured to generate a communication for the one or more other computer users, the communication comprising a shared URL encoded by the shared URL encoding component, and further configured to distribute the shared URL to the one or more other computer users;
   wherein, in operation, the browser application:
      receives an indication to share a selected map context comprising at least some of the plurality of result cards; and
      in response to the indication to share the selected map context:
         receives a selection of the plurality of result cards to be included in the map context, wherein the selection of the plurality of result cards is less than the plurality;
         obtains a shared URL from the shared URL encoding component; and
         generates and distributes a communication to a plurality of users via the communication component.

11. The computer system of claim 10, wherein the shared URL comprises information corresponding to the selection of result cards included in the map context.

12. The computer system of claim 11, wherein the shared URL is configured such that navigation by another browser on another computing device according to the shared URL displays the map context in a browser view of the another browser, the map context including selection of the plurality of result cards.

13. The computer system of claim 12, wherein map context further includes a zoom level for corresponding to the map displayed in the browser view, and wherein the shared URL is configured such that navigation by another browser on another computing device according to the shared URL displays the map context in a browser view of the another browser, including the map at the zoom level.

14. The computer system of claim 12, wherein map context further includes a center point of the map displayed in the browser view, and wherein the shared URL is configured such that navigation by another browser on another computing device according to the shared URL displays the map context in a browser view of the another browser, including the map centered at the center point.

15. The computer system of claim 14, wherein map context further includes a zoom level for corresponding to the map displayed in the browser view, and wherein the shared URL is configured such that navigation by another browser on another computing device according to the shared URL displays the map context in a browser view of the another browser, including the map at the zoom level.

* * * * *